C. L. BATCHELOR.
AUTOMOBILE FENDER.
APPLICATION FILED FEB. 26, 1920.

1,414,930.

Patented May 2, 1922.

UNITED STATES PATENT OFFICE.

CHARLES L. BATCHELOR, OF PORTLAND, OREGON.

AUTOMOBILE FENDER.

1,414,930.  Specification of Letters Patent.  Patented May 2, 1922.

Application filed February 26, 1920. Serial No. 361,486.

*To all whom it may concern:*

Be it known that CHARLES L. BATCHELOR, a citizen of the United States of America, residing at Portland, in the county of Multnomah and State of Oregon, has invented new and useful Improvements in Automobile Fenders, of which the following is a specification.

The object of the invention is to provide a simple and effective fender or bumper adapted for attachment to vehicles of the automobile type, either at the front or the rear end thereof, and to a portion of the same which will not necessitate any modification or reorganization of the construction of the vehicle, for the purpose of receiving and cushioning jars or shocks incident to collisions or contact with opposing objects, to minimize the damage both to the machine and to the object encountered, and with this object in view the invention consists in a construction and combination of parts of which a preferred embodiment is shown in the accompanying drawing, wherein:

Figure 1 is a sectional view of the device applied in the operative position to a vehicle.

Figure 2 is a plan view of the same.

It is the purpose to construct a device of the fender or bumper type which for example, may be applied directly to the axle of the vehicle without necessitating any modification in the construction of the latter or interfering with any of the operative parts of the car which may be related with the axle, and to this end the device embodying the invention is provided with an attaching plate 10 designed for arrangement in contact with the exterior surface of the axle as indicated at 11, that is to say the front surface of the front axle or the rear surface of the rear axle, and to connect said attaching plate with clip plates 12 in contact with the opposite or inner surface of the axle by means of bolts 13 or the equivalents thereof, the fender elements including the yieldingly supported bar 14 being maintained in position solely by said attaching plate.

In the construction illustrated the fender bar is disposed in substantial parallelism with the attaching plate 10 and is connected therewith by coiled compression springs 15 secured at their inner ends in the attaching plate and at their outer ends in said fender bar, and the terminals of the latter are deflected rearwardly and laterally to form the guards 16 which preferably terminate close to the planes of the wheels so that the protective effect of the fender extends continuously from one side of the machine to the other. Obviously the projection of the fender bar beyond the adjacent portion of the car may be regulated by the length of the cushion springs employed, but it is desirable that the same be sufficient to absorb any shock incident to the contact of the car with an opposing object to the end that such object may not come into contact with the car itself or if the device is applied to the front of the car as shown in the drawings, so that such object may not come into contact with the hood.

It will be understood that the primary utility of a device of this kind resides in the fact that it minimizes the possibility of injury to the car so equipped or any other car with which it may collide in moving into and out of parking positions or locations where, though the car is moving relatively slowly, there is always the possibility that through misjudgment of distance or direction the car may come in contact with the wheel or fender of another car already parked with consequent damage to either or both vehicles, whereas the employment of the device forming the subject of the invention will serve to cushion the shock incident to such contact and thereby minimize the risk of injury to either vehicle.

What is claimed is:

A fender for motor vehicles consisting of an attaching plate and means for securing the same to a vehicle axle, a fender bar disposed in substantial parallelism with said attaching plate and provided with rearwardly deflected terminals, and a plurality of uniformly spaced compression springs substantially perpendicular to the fender bar and extending between and terminally attached respectively to said attaching plate and fender bar and serving to support the latter in operative relation with the former.

In testimony whereof he affixes his signature.

CHARLES L. BATCHELOR.